United States Patent
Juneja et al.

(10) Patent No.: US 7,734,290 B2
(45) Date of Patent: Jun. 8, 2010

(54) METHOD FOR MANAGING ACQUISITION LISTS FOR WIRELESS LOCAL AREA NETWORKS

(75) Inventors: Anupam Juneja, San Diego, CA (US); Atul Suri, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 740 days.

(21) Appl. No.: 11/459,311

(22) Filed: Jul. 21, 2006

(65) Prior Publication Data

US 2007/0117585 A1 May 24, 2007

Related U.S. Application Data

(60) Provisional application No. 60/723,358, filed on Oct. 3, 2005.

(51) Int. Cl.
H04W 4/00 (2009.01)
(52) U.S. Cl. .......... 455/434; 455/41.2; 455/432.3; 455/435.3; 455/552.1; 455/410; 370/338; 370/352
(58) Field of Classification Search .......... 455/552.1, 455/432.3, 434, 41.2, 435.3, 410–411, 558, 455/550.1; 370/338, 328, 352
See application file for complete search history.

(56) References Cited

U.S. PATENT DOCUMENTS

| | | | | |
|---|---|---|---|---|
| 4,916,728 A * | 4/1990 | Blair | | 455/455 |
| 5,734,980 A * | 3/1998 | Hooper et al. | | 455/434 |
| 5,832,367 A * | 11/1998 | Bamburak et al. | | 455/62 |
| 5,870,674 A * | 2/1999 | English | | 455/432.2 |
| 5,999,811 A * | 12/1999 | Molne | | 455/432.3 |
| 6,119,005 A * | 9/2000 | Smolik | | 455/436 |
| 6,405,038 B1 * | 6/2002 | Barber et al. | | 455/434 |
| 6,625,451 B1 * | 9/2003 | La Medica et al. | | 455/434 |
| 6,829,481 B2 | 12/2004 | Souissi | | |
| 7,089,033 B2 * | 8/2006 | Leinonen et al. | | 455/553.1 |
| 7,146,130 B2 * | 12/2006 | Hsu et al. | | 455/3.04 |
| 7,352,732 B2 * | 4/2008 | Sata et al. | | 370/338 |
| 7,412,237 B2 * | 8/2008 | Takahashi et al. | | 455/432.3 |
| 2002/0118664 A1 * | 8/2002 | Ishibashi et al. | | 370/338 |
| 2002/0193112 A1 | 12/2002 | Aoki et al. | | |
| 2003/0054809 A1 * | 3/2003 | Bridges et al. | | 455/419 |
| 2003/0133421 A1 * | 7/2003 | Sundar et al. | | 370/328 |
| 2003/0148786 A1 * | 8/2003 | Cooper et al. | | 455/552 |
| 2004/0205158 A1 * | 10/2004 | Hsu | | 709/218 |
| 2005/0130661 A1 | 6/2005 | Aerrabotu et al. | | |
| 2005/0266845 A1 * | 12/2005 | Aerrabotu et al. | | 455/436 |
| 2006/0063560 A1 * | 3/2006 | Herle | | 455/552.1 |
| 2006/0069760 A1 * | 3/2006 | Yeap et al. | | 709/221 |
| 2006/0217147 A1 * | 9/2006 | Olvera-Hernandez et al. | | 455/552.1 |
| 2006/0286977 A1 * | 12/2006 | Khandelwal et al. | | 455/432.1 |

FOREIGN PATENT DOCUMENTS

| | | |
|---|---|---|
| WO | WO 97/30561 | 8/1997 |
| WO | WO 2005/039112 | 4/2005 |
| WO | WO 2005/122601 | 12/2005 |

\* cited by examiner

*Primary Examiner*—Sharad Rampuria

(57) ABSTRACT

An exemplary method for updating acquisition list in a wireless communication device having a first transceiver and a second transceiver is disclosed. The acquisition list associated with the second transceiver. The exemplary method comprises updating a first category of entries of the acquisition list over a wide area network via the first transceiver and updating a second category of entries of the acquisition list by a user through input means on the wireless communication device.

13 Claims, 2 Drawing Sheets

| Category | Pref | Enabled | WLAN-Tech | SSID | MAC-ID | Band | Channel No. | Roaming | Allowed | AuthProfileIndex |
|---|---|---|---|---|---|---|---|---|---|---|
| Carrier | 1 | Yes | 802.11g | Alltel | * | 2.4 US | * | No | Yes | 1 |
| | | | 802.11b | VZW | * | 2.4 US | * | Yes | Yes | 2 |
| | | | | Sprint | * | 2.4 US | * | N/A | No | N/A |
| Enterprise | 2 | Yes | | KWC | | | | | | |
| | | | | KWI | | | | | | |
| | | | | KCJ | | | | | | |
| Hotspot1 | 4 | No | | Boingo | | | | | | |
| User | 3 | Yes | 802.11b | Home | xx.xx | 2.4 US | 6 | No | Yes | 3 |

METHOD FOR MANAGING ACQUISITION LISTS FOR WIRELESS LOCAL AREA NETWORKS

RELATED APPLICATIONS

This application claims the benefit of U.S. Provisional Application 60/723,358, filed Oct. 3, 2005.

TECHNICAL FIELD

This invention relates generally to wireless local area network (WLAN) devices, and more specifically to acquisition list management for wireless local area network devices.

BACKGROUND

Dual mode wireless communication devices, also known as mobile handsets, cellular phones, etc., include a cellular radio for connection to a wireless area network (WAN) and another wireless communication radio for connection to a wireless local area network (WLAN). An example of a WAN is a code division multiple access (CDMA) network, and an example of a WLAN is a 802.11 network. Presently, single mode wireless communication devices include a preferred roaming list (PRL) that is maintained and updated by a service provider. The service provider is typically the cellular network provider, which may also be referred to as a carrier. Typically, the PRL includes an acquisition index section and a system record section. The acquisition index section defines, among other things, the radio parameters for connecting to a particular system, for example, cellular or WLAN. The system records section defines a plurality of entries such as identification of the access points, for example, base stations or wireless access points, and authentication information.

The current arrangement presents various shortcomings. First, since the PRL is maintained by the service provider, the user will have limited or no ability to specify preferences and make unique modifications. These limitations will become even more aggravated as access points for WLANs become increasingly ubiquitous and installed on an ad hoc bases. In order to access these ad hoc networks, the user must contact the service provider in order to enable support for connection to these ad hoc networks which is inconvenient and results in consumer dissatisfaction.

Secondly, if the user makes modifications to the PRL, then subsequent updates to the PRL by the service provider may overwrite the previous modifications supplied by the user, result in unwanted loss of user data. In those cases where the user cannot make a modification to the PRL, the user will not have the ability to connect to certain ad hoc networks that are not supported by the service provider, thereby severely limiting the user's accessibility to WLAN devices.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a table of an exemplary WLAN acquisition list according to one embodiment of the invention.

DETAILED DESCRIPTION

A method for managing acquisition lists on wireless communication devices is disclosed. A CDMA preferred roaming list consists of systems that are controlled by a carrier or the roaming partners of the carrier for access to the carrier's (or roaming partner's) CDMA (or roaming partner's) network. The WLAN systems can be under the control of, for example, the carrier, the roaming partner, an enterprise such as a corporation, individual hot spot providers such as those commonly encountered at hotels and airports, hot spot aggregators, and end users.

The WLAN systems are much more dynamic in nature compared to WAN counterparts. New WLAN systems are constantly being added, removed or relocated. Just like a CDMA system is identified by its system identification (SID), a WLAN system is identified by its service set identifier (SSID). An SSID is a sequence of characters that uniquely names a WLAN. This name allows stations to connect to the desired network when multiple independent networks operate in the same physical area.

But there is significant number of differences between WANs and WLANs as discussed below. The WAN follows an approach where the base stations are centrally managed. A SID is granted by a single agency and is unique. WLANs are much more de-centralized where almost anyone can setup an access point (AP) with any SSID he or she wants. The SSID may not be broadcast due to security concerns. It would be a mistake to merely substitute the SID with SSID for WLAN systems in the PRL and treat them similar to WAN systems as is done in some conventional approaches.

Figure 3:
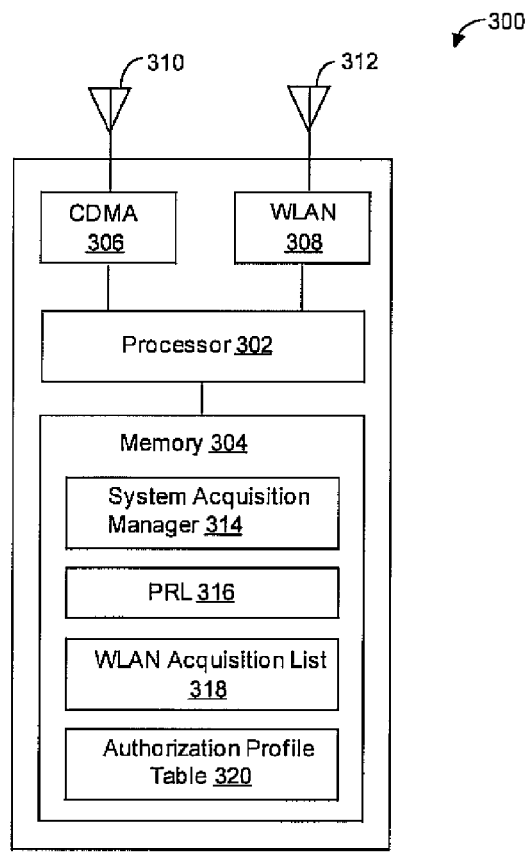
FIG. 3 is a dual mode wireless communication device according to one embodiment of the invention.

Referring to FIG. 1, there is shown an exemplary WLAN acquisition list 100 according to one embodiment. List 100 may be stored on a wireless communication device for connecting to WLAN APs. As shown in FIG. 3, an exemplary wireless communication device 300, typically includes processor 302 coupled to memory 304. CDMA transceiver 306 is communicably coupled to processor 302 for communicating cellular signals via antenna 310. WLAN transceiver 308 is communicably coupled to processor 302 for communicating WLAN signals via antenna 312.

In the exemplary embodiment depicted in FIG. 3, memory 304 includes a system acquisition manager 314, a PRL 316, a WLAN acquisition list 318, and a authentication profile table 320. As described below, the system acquisition manager 314 manages the updating and accessing of the PRL 316, the WLAN acquisition list 318 and the authentication profile table 320. In this exemplary embodiment, the PRL 316 contains system acquisition information for a CDMA network, whereas the acquisition list 318 contains system acquisition information for WLAN APs. Selection of systems between the CDMA network and the WLAN APs can be implemented according to a selection scheme as desired.

Referring back to FIG. 1, list 100 includes a number of fields 102 and a number of entries 104. Each entry 104 defines the radio parameters for accessing a WLAN system. In one preferred embodiment each entry 104 is divided into a categories 106. As shown in FIG. 1, list 100 includes category carrier 108, enterprise 110, hotspot 112, and user 114. It should be understood that the category list and the number of entries within in category depicted in list 100 is only illustrative, and in other embodiments the number of categories and the number of entries within each category may vary. In one embodiment, the number of entries within a category can be limited. In such case, if a new entry is added that would exceed the limit of entries, the least recently used entry can be removed to accommodate the new entry.

The service provider can manage entries in the carrier category 108 by provisioning the handsets with its known access points at the point of sale and can update these entries using over the air updates or other communication means such as direct connections. In some embodiments, the carrier can update the entries in the carrier category 108 via communications over the WLAN interface (e.g., via communications over the Internet). The enterprise category 110 can be used by entities such as corporations and businesses for defining access points associated with those entities. For example, an enterprise entity could negotiate services with the service provider. In this way, the service provider could provide a secure mechanism (login/password) to allow the enterprise entity to provision and update enterprise category 110 entries of list 100.

The hotspot category 112 is utilized by hotspot providers that also must arrange secure mechanisms (logins/passwords) with a carrier to provision and update the hotspot category 112 entries. Additional hotspot categories can be added if the carrier has agreements with more than one hotspot vendor/aggregator. The user category 114 is provided in the acquisition list 100. Entries in the user category 114 can be added, edited, and deleted by the user of the handset. For example, when a user wishes to connect to an AP that has not yet been provisioned, an interface is provided to prompt the user to input relevant information which is stored in the user category 114 for a particular AP. For example, the interface may prompt the user to provide authentication parameters. The interface may also provide for the user to view the current entries and make changes. Once a user has entered the necessary information in the user category 114 for a particular AP, the wireless communications device can automatically connect to this AP, subsequently.

The service provider can decide how much control it wants to give to the user in setting these preferences in the user category 114. The service provider can also decide which categories are allowed on a handset to differentiate between different levels of services such as premium and regular users, for example.

To protect the integrity of list 100, a system acquisition manager (see FIG. 3) provides the facility for updating the list 100 entries. For example, a protection scheme can be implemented such that modifications in one category do not affect entries in other categories. In this way, for example, updates made by the service provider to carrier category 108 entries do not modify user category 114 entries. In certain embodiments, the entries in one category can be updated independently of entries in the other categories.

Referring again to FIG. 1, each category 106 of exemplary list 100 may further be associated with a priority preference 116 and an enabled flag 118. The priority preference is established, for example, by the service provider at the point of sale. In the exemplary list 100, the carrier category 108 is the highest priority preference, the enterprise category 110 is the next highest priority, the user category 114 is the third preference followed by the hotspot category 112. A preference criteria (not shown) can also be defined for each entry within a category. The enabled flag 118 defines whether a particular category 106 is enable for use in acquiring a WLAN system. For example, list 100 allows all categories except hotspot category 112 to be acquired. In certain embodiments, the enable flag can be updated dynamically. For example, if a particular category is disable such as hotspot category 112, and the user wishes to access an AP of the hotspot provider, the system acquisition manager may prompt the user as to whether he or she wishes to enable the category. This enablement may include fees that are charged to the user's account.

The service provider can send an over the air message which is received by the system acquisition manager for enabling hotspot category 112.

Acquisition list 100 may also include one or more WLAN radio parameters 120. Exemplary list 100 shows WLAN radio parameters 120 including WLAN technology, SSID, MAC-id, Band, Channel No., Roaming permitted, and access allowed. In certain embodiments a most frequently used set of APs can be maintained to allow faster acquisition of WLAN systems.

Figure 2:
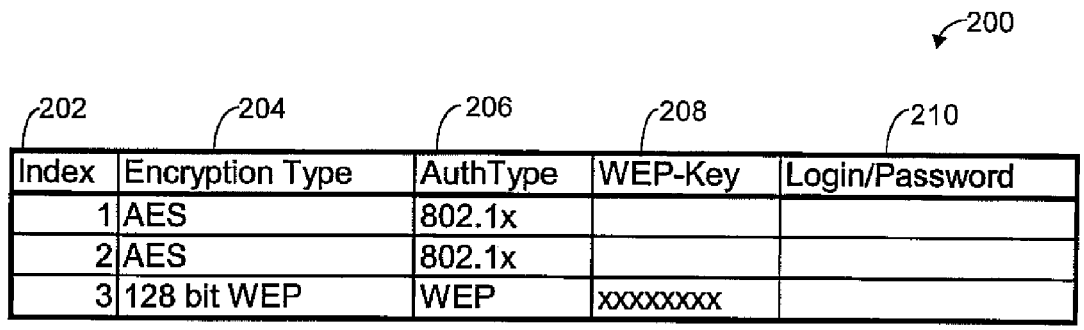
FIG. 2 is a table of the authentication profile according to one embodiment of the invention.

Continuing with FIG. 1, an authentication profile index field 122 is associated with each entry of exemplary list 100. This index 122 references an entry in an authorization profile table 200, as shown in FIG. 2. In other embodiments, the data referred to by this index can be incorporated directly into list 100.

Referring to FIG. 2, an authentication profile table 200 is shown. Table 200 includes index field 202, encryption type field 204, authentication type field 206, WEP-key field 208, and log-in/password field 210. Contents of the authentication profile table 200 can be encrypted before being stored at the handset to increase security. The index field 202 is referenced by the authentication profile index 122 of list 100 for determining the authentication parameters for that particular index entry.

Certain details and features have been omitted that should be apparent to a person of ordinary skill in the art having the benefit of this disclosure. The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structure as containing embodiments of the present invention.

The description and drawings contained herein are particular embodiments of the invention and are representative of the subject matter broadly contemplated by the invention. However, the invention encompasses other embodiments that will be obvious to those skilled in the art. Accordingly, the scope of the invention is limited only by the appended claims.

What is claimed is:

1. A method for updating an acquisition list in a wireless communication device having a first transceiver associated with a wireless area network and a second transceiver associated with a wireless local area network, the acquisition list associated with the second transceiver, the method comprising:

updating a first category of entries of the acquisition list over the wide area network via the first transceiver, wherein the first category of entries includes,
    a carrier category managed by a service provider that provisions the wireless communication device to include a plurality of carrier access points,
    a carrier authentication profile associated with the carrier category that is stored in an authentication profile table;

updating a second category of entries of the acquisition list by a user through input means on the wireless communication device, wherein the second category of entries includes,
    a user category that enables the user to connect to a user access point that is not associated with the carrier access points, a user authentication profile associated with the user category that is stored in the authentication profile table; and enabling the updating in the carrier category while not modifying the user; and encrypting the authentication profile table, each entry of the authentication profile table identifying:
an encryption type;
an authentication type;
a key value; and
login data.

2. The method of claim 1, further comprising updating the first category of entries of the acquisition list over a wireless local area network via the second transceiver.

3. The method of claim 1, wherein the second category of entries has an enabled flag, such that update of the second category of entries is provided only if the enabled flag is set.

4. The method of claim 3, wherein the enabled flag can be set via communications sent over the wide area network via the first transceiver.

5. The method of claim 3, wherein the enabled flag can be set via communications sent over a wireless local area network via the second transceiver.

6. The method of claim 1, wherein each entry of the first category of entries and the second category of entries is associated with a priority level.

7. A method for acquiring a system in a wireless communication device having a first transceiver associated with a wireless area network and a second transceiver associated with a wireless local area network, the wireless communication device further including an acquisition list comprising a first category of entries and a second category of entries, the method comprising:
determining which of the first category of entries and the second category of entries has a higher priority and a lower priority, wherein the first category of entries includes,
a carrier category managed by a service provider that provisions the wireless communication device to include a plurality of carrier access points,
a carrier authentication profile associated with the carrier category that is stored in an authentication profile table,
wherein the second category of entries includes,
a user category that enables the user to connect to a user access point that is not associated with the carrier access points,
a user authentication profile associated with the user category that is stored in the authentication profile table;
attempting to acquire via the second transceiver a first system according to the higher priority one of the first category and the second category;
attempting to acquire a second system via the second transceiver according to the lower priority one of the first category and the second category; and
enabling the updating in the carrier category while not modifying the user category; and
encrypting the authentication profile table, each entry of the authentication profile table identifying:
an encryption type;
an authentication type;
a key value; and
login data.

8. A wireless communication device, comprising
a processor coupled to a memory;
input means communicably coupled to the processor;
a first transceiver associated with a wireless area network communicably coupled to the processor;
a second transceiver associated with a wireless local area network communicably coupled to the processor, the memory configured to store an acquisition list that includes,
a first category of entries that further includes,
a carrier category managed by a service provider that provisions the wireless communication device to include a plurality of carrier access points,
a carrier authentication profile associated with the carrier category that is stored in an authentication profile table, and
a second category of entries that further includes,
a user category that enables the user to connect to a user access point that is not associated with the carrier access points,
a user authentication profile associated with the user category that is stored in the authentication profile table;
the processor configured to update the acquisition list by:
updating the first category of entries of the acquisition list via communications received over a wide area network via the first transceiver,
updating the second category of entries of the acquisition list by a user through the input means on the wireless communication device, and
enabling the updating in the carrier category while not modifying the user category;
wherein the authentication profile table is encrypted, each entry of the authentication profile table identifying:
an encryption type;
an authentication type;
a key value; and
login data.

9. The wireless communication device of claim 8, the processor configured to update the first category of entries of the acquisition list via communications received over a wireless local area network via the second transceiver.

10. The wireless communication device of claim 8, wherein the second category of entries has an enabled flag, such that update of the second category of entries is provided only if the enabled flag is set.

11. The wireless communication device of claim 10, wherein the enabled flag can be set via communications received over the wide area network via the first transceiver.

12. The wireless communication device of claim 10, wherein the enabled flag can be set via communications received over a wireless local area network via the second transceiver.

13. The wireless communication device of claim 8, wherein each entry of the first category of entries and the second category of entries is associated with a priority level.

* * * * *